US00RE37057E

(19) United States
(12) Reissued Patent
Lee

(10) Patent Number: US RE37,057 E
(45) Date of Reissued Patent: Feb. 20, 2001

(54) APPARATUS AND METHOD FOR CONVERTING AN HDTV SIGNAL TO A NON-HDTV SIGNAL

(75) Inventor: Dong H. Lee, Kyungki-do (KR)

(73) Assignee: LG Electronics Inc., Seoul (KR)

(21) Appl. No.: 09/080,390

(22) Filed: May 18, 1998

Related U.S. Patent Documents

Reissue of:
(64) Patent No.: 5,519,446
Issued: May 21, 1996
Appl. No.: 08/339,721
Filed: Nov. 14, 1994

(30) Foreign Application Priority Data

Nov. 13, 1993 (KR) ..... 93-24121
Nov. 13, 1993 (KR) ..... 93-24122

(51) Int. Cl.[7] ..... H04N 7/01
(52) U.S. Cl. ..... 348/556; 348/402; 348/443
(58) Field of Search ..... 348/556, 553, 348/402, 555, 443, 441, 445; H04N 7/01

(56) References Cited

U.S. PATENT DOCUMENTS 5,187,575 * 2/1993 Lim ..... 348/555
5,262,854 11/1993 Ng ..... 358/133
5,365,276 * 11/1994 Imai ..... 348/556
5,371,549 * 12/1994 Park et al. ..... 348/402
5,384,974 * 1/1995 Bae ..... 348/555

OTHER PUBLICATIONS

"IEEE Transaction on Consumer Electronics" vol. 35, #3, Aug. 1989.*

* cited by examiner

*Primary Examiner*—Victor R. Kostak
(74) *Attorney, Agent, or Firm*—Long, Aldridge & Norman, LLP

(57) ABSTRACT

A digital video signal reception apparatus comprising a multiplexer selection controller for outputting a plurality of control signals according to a format of a compressed input digital video signal, a decoder for decoding the compressed input digital video signal, a frame rate conversion circuit for convening a frame rate of the decoded digital video signal from the decoder into a desired value under the control of the multiplexer selection controller, a multiplexer for selecting one of the decoded digital video signal from the decoder and an output video signal from the frame rate conversion circuit under the control of the multiplexer selection controller, a decimation circuit for performing a decimation operation to convert the number of horizontal scanning lines of an output video signal from the multiplexer into a desired value, a display mode conversion circuit for performing a display mode conversion operation so that an output video signal from the decimation circuit can be displayed in a desired display mode, and a display processor for displaying an output video signal from the display mode conversion circuit on a screen of a monitor. The received video signal can be displayed on an existing non-high definitions TV receiver in various display modes. Therefore, the user can view an HDTV broadcasting even on the existing non-high definitions TV receiver.

51 Claims, 14 Drawing Sheets

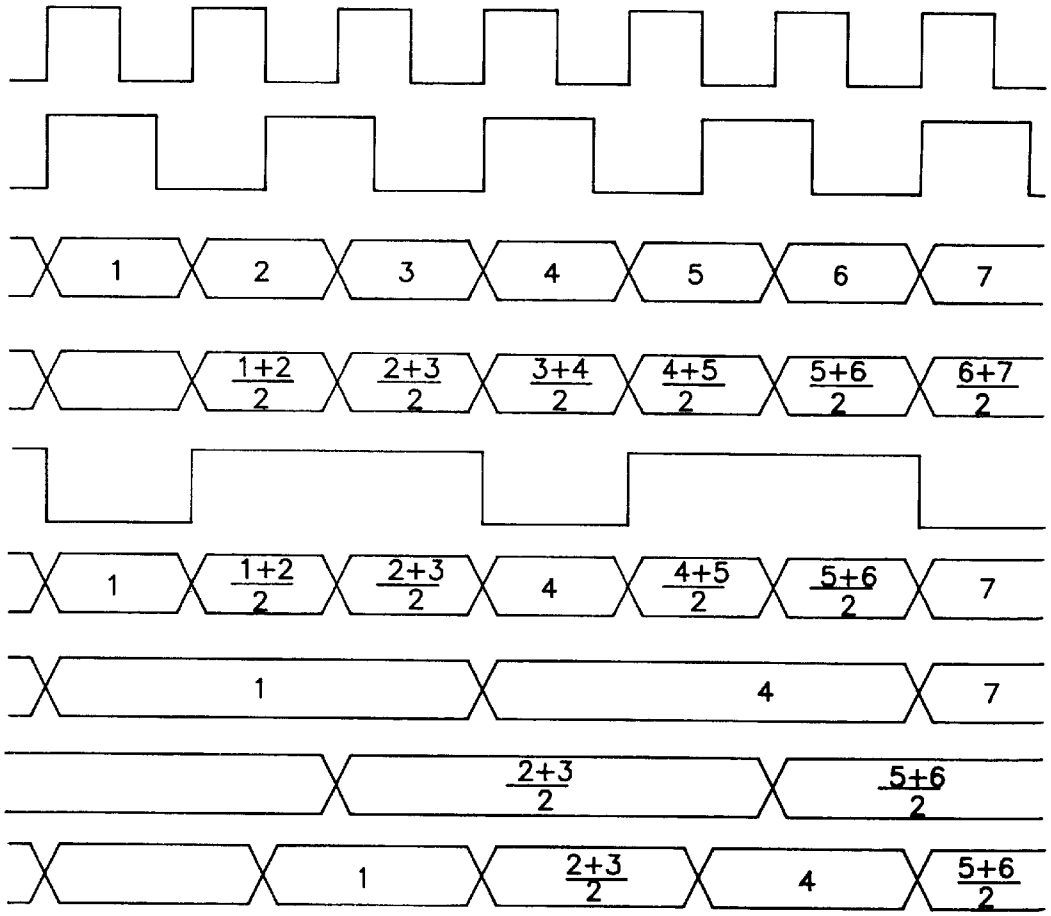
FIG.11A INPUT CLOCK
FIG.11B OUTPUT CLOCK
FIG.11C INPUT SIGNAL
FIG.11D 2-DIVIDER 431 OUTPUT
FIG.11E MULTIPLEXER 432 SELECTION SIGNAL
FIG.11F MULTIPLEXER 432 OUTPUT
FIG.11G 1:3 DEMULTIPLEXER 433 FIRST OUTPUT
FIG.11H 1:3 DEMULTIPLEXER 433 THIRD OUTPUT
FIG.11I MULTIPLEXER 434 OUTPUT
1
2
3
4
5
6
7
1+2/2
2+3/2
3+4/2
4+5/2
5+6/2
6+7/2
5+6/2

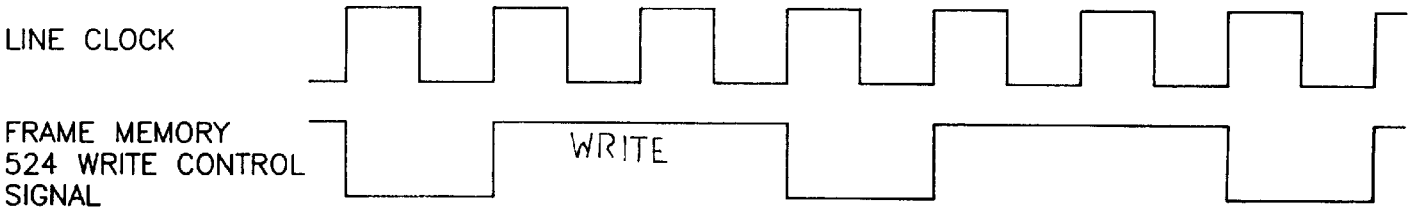
FIG. 14A
FIG. 14B
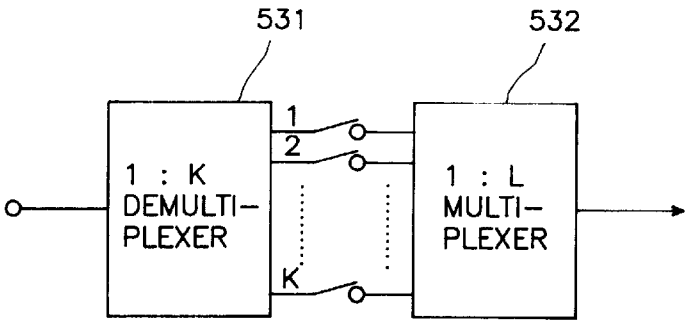
FIG. 15

APPARATUS AND METHOD FOR CONVERTING AN HDTV SIGNAL TO A NON-HDTV SIGNAL

Matter enclosed in heavy brackets [ ] appears in the original patent but forms no part of this reissue specification; matter printed in italics indicates the additions made by reissue.

*This is a reissue of Ser. No. 08/337,721 filed Nov. 14, 1994, U.S. Pat. No. 5,519,446.*

BACKGROUND OF THE INVENTION

1. Field of the Invention

The present invention relates in general to the reception of a digital video signal, and more particularly to a digital video signal reception apparatus which is capable of displaying a high definition television (referred to hereinafter as HDTV) broadcasting signal on an existing TV receiver.

2. Description of the Prior Art

According to an HDTV standard of the U.S.A., a video signal can be encoded and decoded into various formats with no limitation to a single format. Namely, the video signal can be encoded and decoded into six formats, an interlaced scanning format with 1050 horizontal scanning lines and a frame rate of 60 Hz, progressive scanning formats with 1050 horizontal scanning lines and frame rates of 24 Hz and 30 Hz, and progressive scanning formats with 787.5 horizontal scanning lines and frame rates of 24 Hz, 30 Hz and 60 Hz.

Although the transmission formats of the video signal are varied as mentioned above, a display format of the video signal is limited to a single type depending on a characteristic of a monitor. This requires an HDTV receiver to have a video format conversion apparatus which is capable of converting any of the six video formats into the display format characteristic of the monitor. On the other hand, for the user with an existing non-high definition TV receiver, there may be required an apparatus which is capable of performing a video format conversion operation so that an HDTV broadcasting signal can be displayed on the existing non-high definitions TV receiver.

SUMMARY OF THE INVENTION

Therefore, the present invention has been made in view of the above problem, and it is an object of the present invention to provide a digital video signal reception apparatus which is capable of performing a video format conversion operation so that a received high definitions digital video signal can be displayed on an existing non-high definitions TV receiver.

In accordance with the present invention, the above and other objects can be accomplished by a provision of a digital video signal reception apparatus comprising multiplexer selection control means for outputting a plurality of control signals according to a format of a compressed input digital video signal; decoding means for decoding the compressed input digital video signal; frame rate conversion means for convening a frame rate of the decoded digital video signal from said decoding means into a desired value under the control of said multiplexer selection control means; first multiplexing means for selecting one of the deemed digital video signal from said decoding means and an output video signal from said frame rate conversion means under the control of said multiplexer selection control means; decimation means for performing a decimation operation to convert the number of horizontal scanning lines of an output video signal from said first multiplexing means into a desired value; display mode conversion means for performing a display mode conversion operation so that an output video signal from said decimation means can be displayed in a desired display mode; and display processing means for displaying an output video signal from said display mode conversion means on a screen of a monitor.

BRIEF DESCRIPTION OF THE DRAWINGS

The above and other objects, features and advantages of the present invention will be more clearly understood from the following detailed description taken in conjunction with the accompanying drawings, in which:

FIGS. 11A to 11I are waveform diagrams of signals from components in a 3:2 horizontal decimator in FIG. 9;

FIGS. 14A and 14B are waveform diagrams of signals from components in FIG. 13;

FIG. 15 is a detailed block diagram of a third NTSC converter in FIG. 1.

DETAILED DESCRIPTION OF THE PREFERRED EMBODIMENTS

Figure 1:
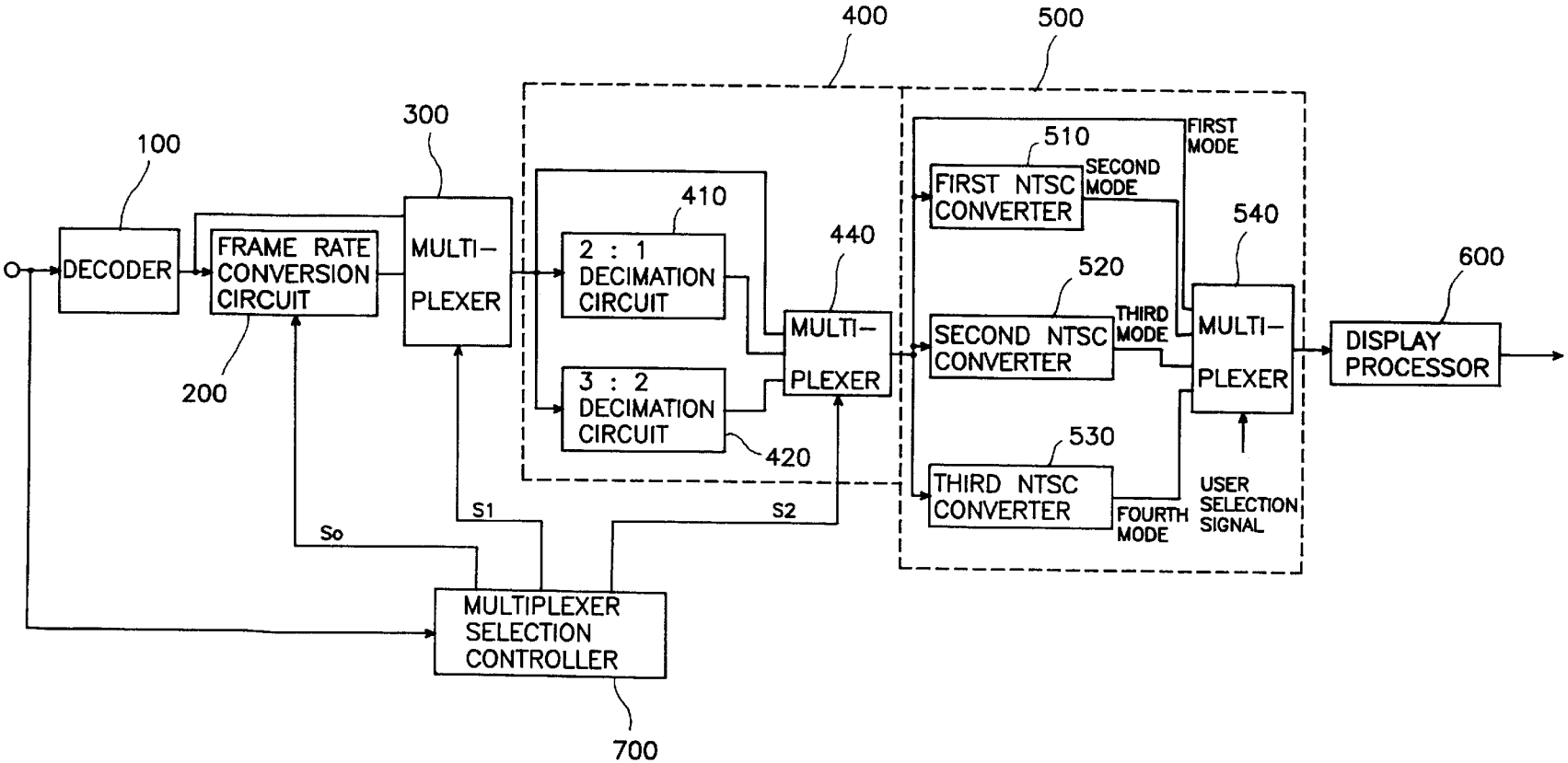
FIG. 1 is a block diagram of a digital video signal reception apparatus in accordance with the present invention.

Referring to FIG. 1, there is shown a block diagram of a digital video signal reception apparatus in accordance with the present invention. As shown in this drawing, the digital video signal reception apparatus comprises a decoder 100 for decoding a compressed input digital video signal, a frame rate conversion circuit 200 for converting a frame rate of the decoded digital video signal from the decoder 100 into 30 Hz, a multiplexer 300 for selecting one of the decoded digital video signal from the decoder 100 and an output video signal from the frame rate conversion circuit 200 according to the frame rate of the decoded digital video signal from the decoder 100, a decimation circuit 400 for performing a decimation operation to convert the number of horizontal scanning lines of an output video signal from the multiplexer 300 into 525, a display mode conversion circuit 500 for performing a display mode conversion operation so that an output video signal from the decimation circuit 400 can be displayed in a display mode desired by the user, a display processor 600 for displaying an output video signal from the display mode conversion circuit 500 on a screen of a monitor, and a multiplexer selection controller 700 for controlling the frame rate conversion circuit 200, the multiplexer 300 and the decimation circuit 400 according to a format of the compressed input digital video signal.

Figure 3:
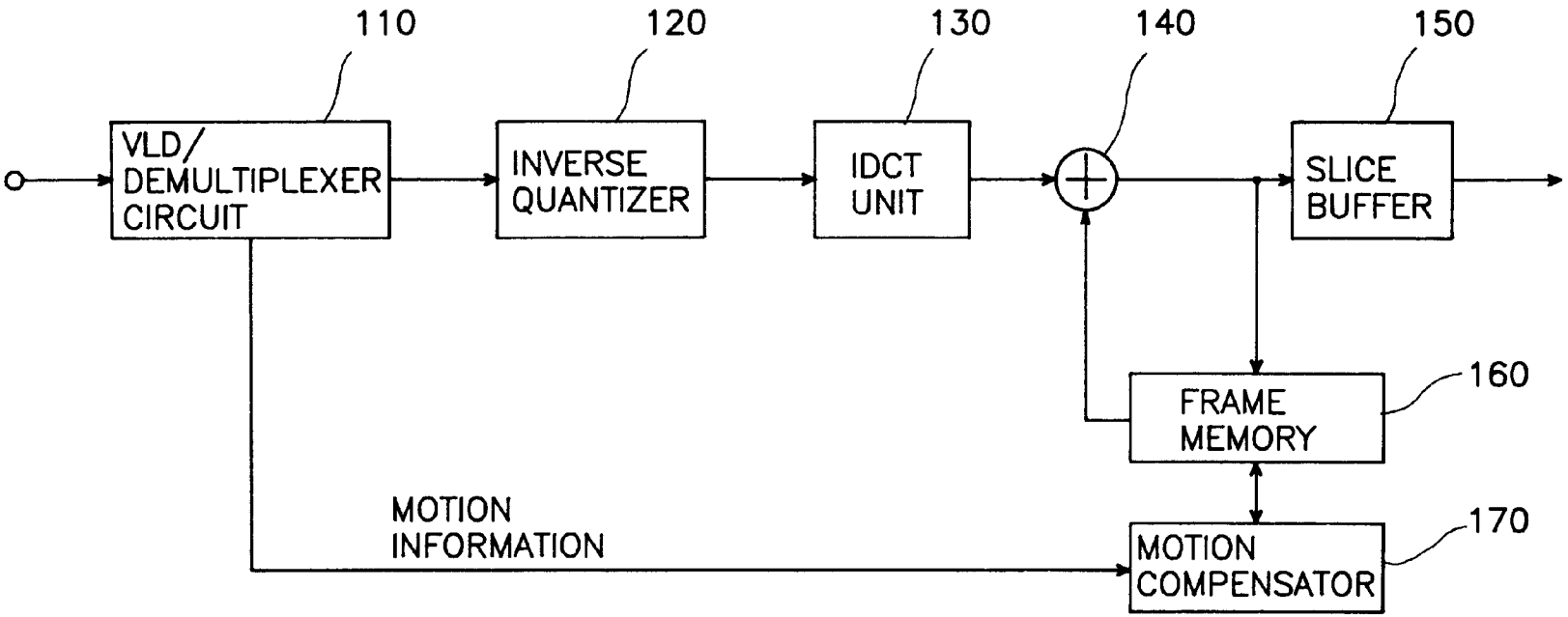
FIG. 3 is a detailed block diagram of an embodiment of a decoder in FIG. 1.

Referring to FIG. 3, there is shown a detailed block diagram of an embodiment of the decoder 100 in FIG. 1. As shown in this drawing, the decoder 100 includes a variable length decoder (VLD)/demultiplexer circuit 110, an inverse quantizer 120, an inverse discrete cosine transform (IDCT) unit 130, a motion compensator 170, an adder 140, a frame memory 160 and a slice buffer 150. The VLD/demultiplexer circuit 110 is adapted to separate motion information, a macro block type, discrete cosine transform (DCT) coefficients and a step size from the compressed input digital video signal. The inverse quantizer 120 is adapted to inverse-quantize the DCT coefficients from the VLD/demultiplexer circuit 110. The IDCT unit 130 acts to perform an inverse discrete cosine transform with respect to the inverse-quantized DCT coefficients from the inverse quantizer 120 to obtain a displaced frame difference signal indicative of a difference between previous and present frames. Then, the displaced frame difference signal from the IDCT unit 130 is applied to the adder 140.

The motion compensator 170 is adapted to compensate for a motion of a video signal of the present frame on the basis of a restored video signal of the previous frame stored in the frame memory 160 and the motion information from the VLD/demultiplexer circuit 110. The motion-compensated video signal from the motion compensator 170 is then stored into the frame memory 160. The adder 140 acts to add the displaced frame difference signal from the IDCT unit 130 and the motion-compensated video signal from the frame memory 160 to restore the video signal of the present frame. The restored video signal of the present frame from the adder 140 is stored into the frame memory 160 for the motion compensation of the next frame. The restored video signal of the present frame from the adder 140 is also applied to the slice buffer 150. The slice buffer 150 is adapted to input the restored video signal of the present frame from the adder 140 in the unit of block and output the inputted video signal in the unit of line. Then, the decoded digital video signal from the decoder 100 is applied to the frame rate conversion circuit 200 and the multiplexer 300.

Figure 4:
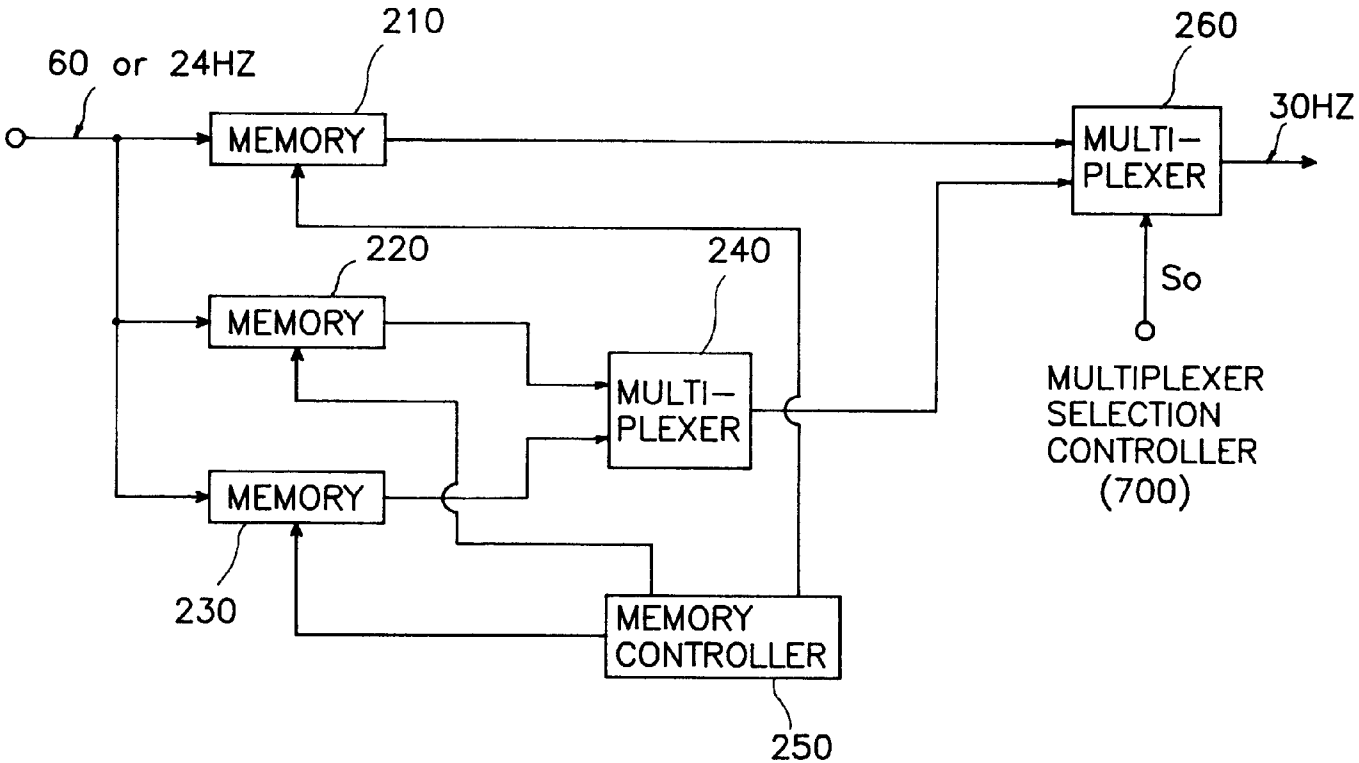
FIG. 4 is a detailed block diagram of a frame rate conversion circuit in FIG. 1.

Referring to FIG. 4, there is shown a detailed block diagram of the frame rate conversion circuit 200 in FIG. 1. The frame rate conversion circuit 200 is adapted to convert the frame rate of the decoded digital video signal from the decoder 100 into 30 Hz if it is not 30 Hz. To this end, the frame rate conversion circuit 200 includes memories 210–230, multiplexers 240 and 260 and a memory controller 250. First, in the case where the frame rate of the decoded digital video signal from the decoder 100 if 60 Hz, under control of the memory controller 250, the memory 210 performs a write operation with respect to the decoded digital video signal from the decoder 100 in such a manner that one of two successive frames thereof is skipped (in groups of two frames) and a read operation with respect to the stored video signal at a speed of half that of the write operation. As a result, the memory 210 outputs a video signal of the 30 Hz frame rate to the multiplexer 260.

On the other hand, in the case where the frame rate of the decoded digital video signal from the decoder 100 is 24 Hz, it must be converted into 30 Hz at a ratio of 4:5. To this end, one of four frames must be read twice every four frames. Namely, the memory 220 performs a write operation with respect to a first one of four successive frames of the decoded digital video signal from the decoder 100 (in groups of four frames) under the control of the memory controller 250. The memory 230 performs a write operation with respect to all the successive four frames of the decoded digital video signal from the decoder 100 in groups of four frames under the control of the memory controller 250. In a read operation, under the control of the memory controller 250, the stored frame from the memory 220 is read and all the stored four frames from the memory 230 are then read at a speed of 5/4 that of the write operation. The multiplexer 240 selects first the frame from the memory 220 and then the four frames from the memory 230 to output a video signal of the 30 Hz frame rate to the multiplexer 260. The result is that five frames in total are read, two of which are identical.

The multiplexer 260 selects one of output signals from the memory 210 and the multiplexer 250 in response to a control signal SO from the multiplexer selection controller 700. Namely, if the frame rate of the decoded digital video signal from the decoder 100 is 24 Hz, the multiplexer 260 selects the output signal from the multiplexer 250. If the frame rate of the decoded digital video signal from the decoder 100 is 60 Hz, the multiplexer 260 selects the output signal from the memory 210. The memory controller 250 acts to control the read and write operations of the memories 210–230.

Figures 5A, 5B, 5C, 5D, 5E, 5F, 5G, 5H, 5I:
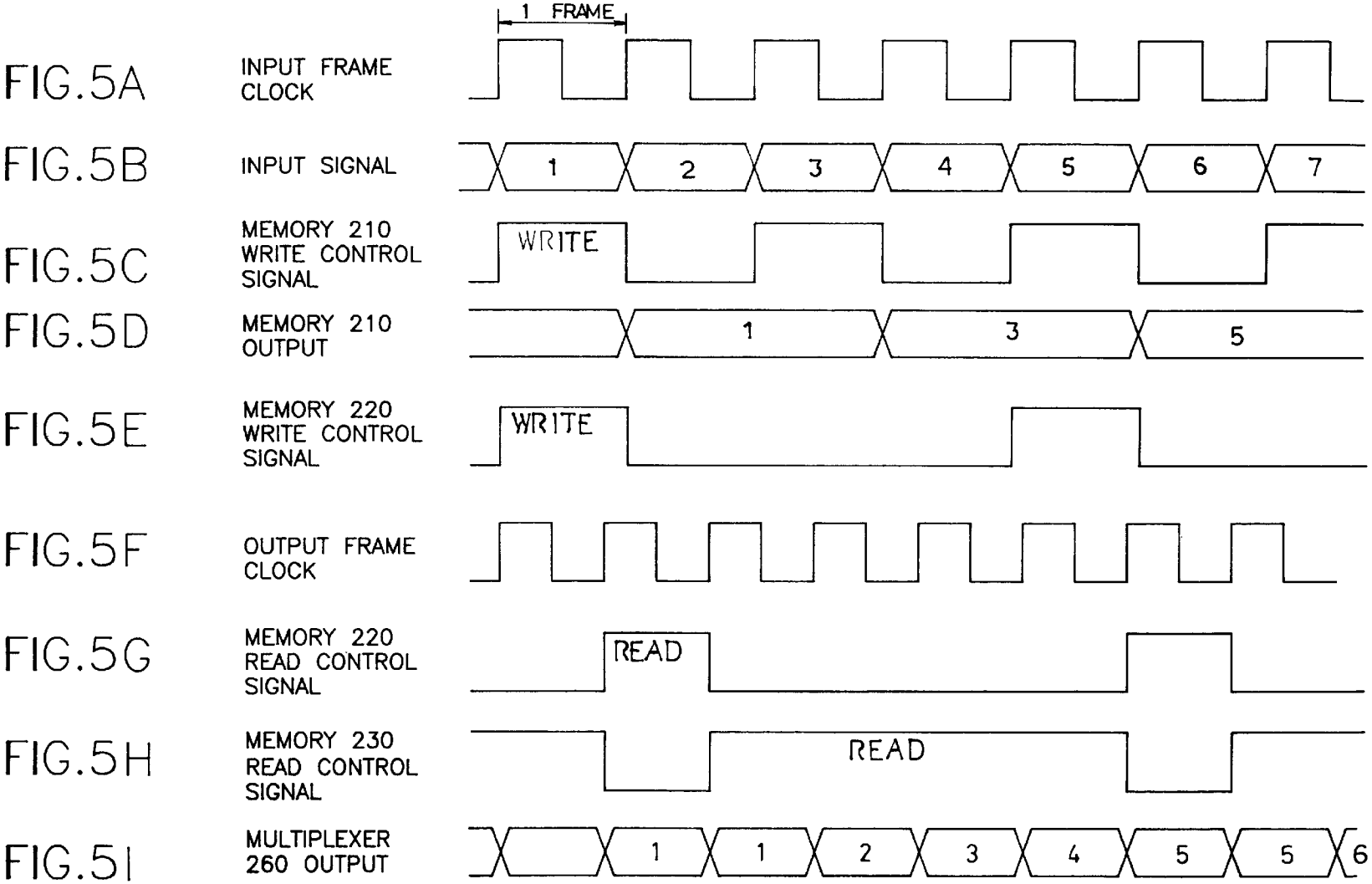
FIGS. 5A to 5I are waveform diagrams of signals from components in FIG. 4.

FIGS. 5A to 5I are waveform diagrams illustrating the operation of the frame rate conversion circuit 200. When the video signal of the 60 Hz frame rate as shown in FIG. 5B is inputted in response to an input frame clock signal as shown in FIG. 5A, it is written into the memory 210 under the control of the memory controller 250 in such a manner that one of the successive two frames thereof is skipped (in groups of two frames) as shown in FIG. 5C. In the read operation, under the control of the memory controller 250, the stored frame from the memory 210 is read at the speed of half that of the write operation as shown in FIG. 5D. As a result, when the frame rate of the inputted video signal is 60 Hz, it is converted into the 30 Hz.

On the other hand, in the case where the video signal of the 24 Hz frame rate is inputted, it is written into the memory 220 under the control of the memory controller 250 in such a manner that the first one of the successive four frames thereof is written (in groups of four frames) as shown in FIG. 5E. The video signal of the 24 Hz frame rate is also written into the memory 230 under the control of the memory controller 250 in such a manner that all the successive four frames thereof are written in the unit of four frames, although not shown. For the conversion of the frame rate of the video signal from 24 Hz to 30 Hz, an input/output frame clock ratio must be 4:5. For this reason, an output frame clock signal is produced as shown in FIG. 5F. In response to the output frame clock signal as shown in FIG. 5F, the stored frame from the memory 220 is read as shown in FIG. 5G and the stored four frames from the memory 230 are read for a time period that the read operation of the memory 220 is not performed, as shown in FIG. 5H. Then, the multiplexer 240 selects alternately the frame from the memory 220 and the four frames from the memory 230 to output the video signal of the 30 Hz frame rate as shown in FIG. 5I to the multiplexer 260.

The multiplexer 300 is adapted to select one of the decoded digital video signal from the decoder 100 and the output video signal from the frame rate conversion circuit 200 according to the frame rate of the decoded digital video signal from the decoder 100 in response to a control signal S1 from the multiplexer selection controller 700. Namely, if the frame rate of the decoded digital video signal from the decoder 100 is 30 Hz, the multiplexer 300 selects the output video signal from the decoder 100 because of no necessity for converting the frame rate. If the frame rate of the decoded digital video signal from the decoder 100 is 24 Hz or 60 Hz, the multiplexer 300 selects the output video signal from the frame rate conversion circuit 200. As a result, the multiplexer 300 outputs the video signal of the 30 Hz frame rate to the decimation circuit 400.

The decimation circuit 400 is adapted to convert the number of the horizontal scanning lines of the output video signal from the multiplexer 300 into 525. To this end, the decimation circuit 400 includes, as shown in FIG. 1, a 2:1 decimation circuit 410 for performing a 2:1 decimation operation with respect to the output video signal from the multiplexer 300, a 3:2 decimation circuit 420 for performing a 3:2 decimation operation with respect to the output video signal from the multiplexer 300, and a multiplexer 440 for selecting one of the output video signal from the multiplexer 300, an output video signal from the 2:1 decimation circuit 410 and an output video signal from the 3:2 decimation circuit 420 in response to a control signal S2 from the multiplexer selection controller 700. If the number of the horizontal scanning lines of the output video signal from the multiplexer 300 is 525, the multiplexer 440 outputs directly the output video signal from the multiplexer 300. Also, the multiplexer 440 selects the output video signal from the 2:1 decimation circuit 410 if the number of the horizontal scanning lines of the output video signal from the multiplexer 300 is 1050, whereas the output video signal from the 3:2 decimation circuit 420 if the number of the horizontal scanning lines of the output video signal from the multiplexer 300 is 787.5.

Figure 6:
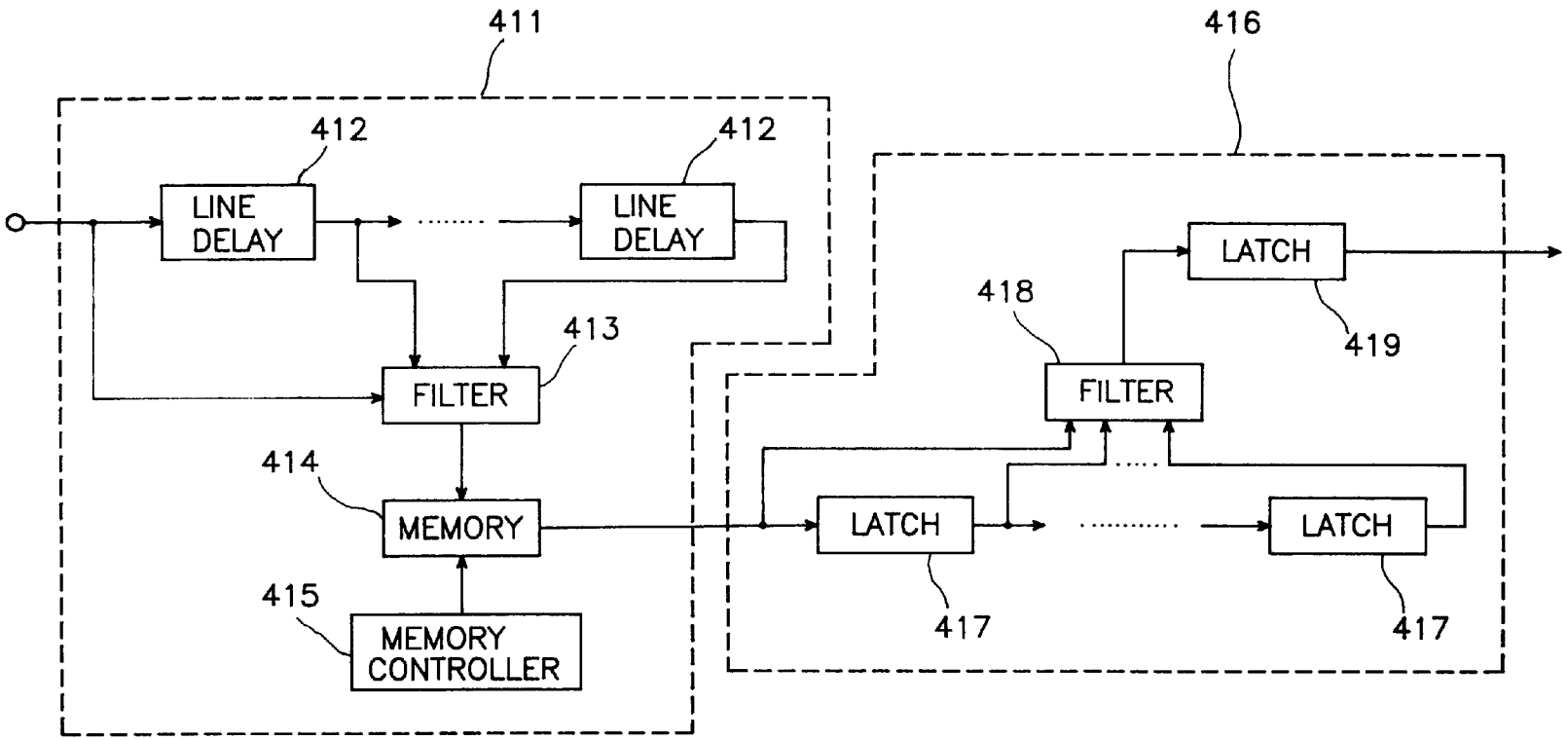
FIG. 6 is a detailed block diagram of a 2:1 decimation circuit in FIG. 1.

Referring to FIG. 6, there is shown a detailed block diagram of the 2:1 decimation circuit 410 in FIG. 1. As shown in this drawing, the 2:1 decimation circuit 410 includes a 2:1 vertical decimator 411 for performing a 2:1 vertical decimation operation with respect to the output video signal from the multiplexer 300, and a 2:1 horizontal decimator 416 for performing a 2:1 horizontal decimation operation with respect to an output video signal from the 2:1 vertical decimator 411. The 2:1 vertical decimator 411 includes a plurality of line delays 412, a filter 413, a memory 414 and a memory controller 415. In order to remove an aliasing of the output video signal from the multiplexer 300, the plurality of line delays 412 are connected in series and the filter 413 filters output video signals from the plurality of line delays 412 and the output video signal from the multiplexer 300. Under control of the memory controller 415, the memory 414 performs a write operation with respect to an output video signal from the filter 413 in such a manner that one of successive two lines thereof is skipped (in groups of two lines) and a read operation with respect to the stored video signal at a speed of half that of the write operation.

Figures 7A, 7B, 7C, 7D:
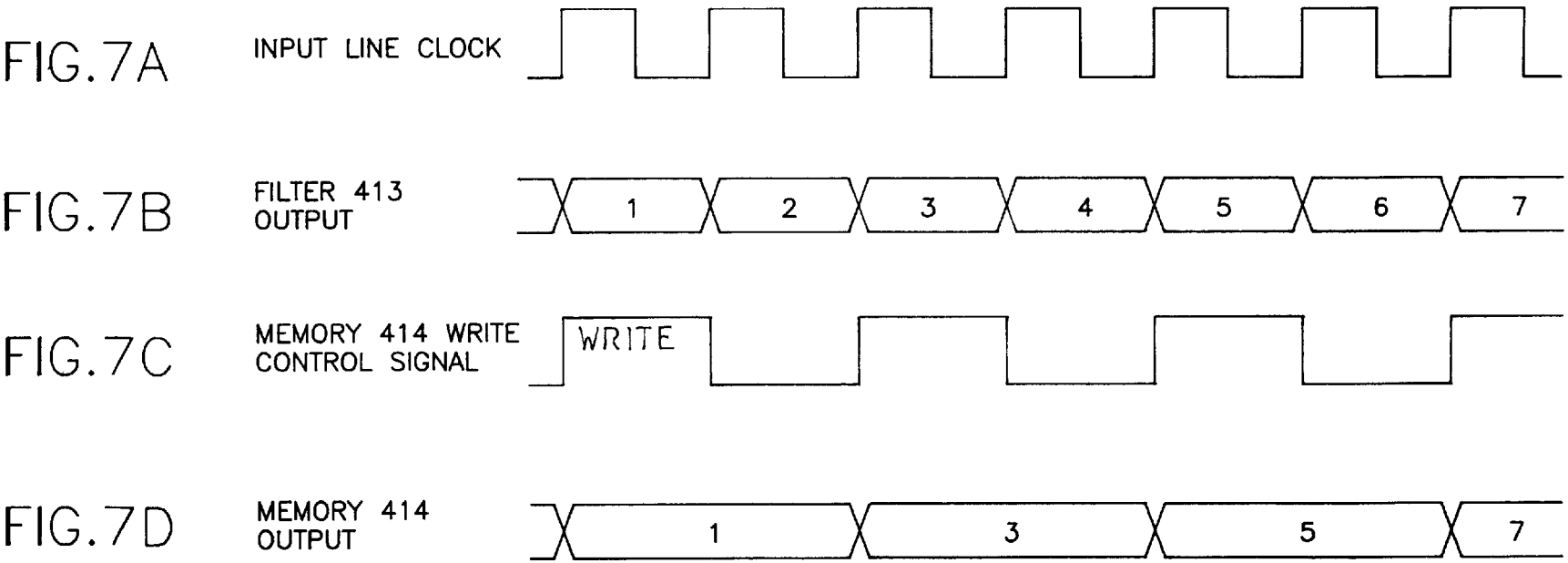
FIGS. 7A to 7D are waveform diagrams of signals from components in a 2:1 vertical decimator in FIG. 6.

FIGS. 7A to 7D are waveform diagrams illustrating the operation of the 2:1 vertical decimator 411. When the output video signal from the filter 413 as shown in FIG. 7B is inputted in response to an input line clock signal as shown in FIG. 7A, it is written into the memory 414 under the control of the memory controller 415 in such a manner that one of the successive two lines thereof is skipped (in groups of two lines) as shown in FIG. 7C. In the read operation, under the control of the memory controller 415, the stored line from the memory 414 is read at the speed of half that of the write operation as shown in FIG. 7D.

The 2:1 horizontal decimator 416 includes, as shown in FIG. 6, a plurality of latches 417, a filter 418 and a latch 419. In order to remove an aliasing of the output video signal from the 2:1 vertical decimator 411, the plurality of latches 417 are connected in series and the filter 418 filters output video signals from the plurality of latches 417 and the output video signal from the 2:1 vertical decimator 411. The latch 419 performs a latching operation with respect to an output video signal from the filter 418 in such a manner that one of successive two pixels is skipped (in groups of two pixels).

Figures 8A, 8B, 8C, 8D:
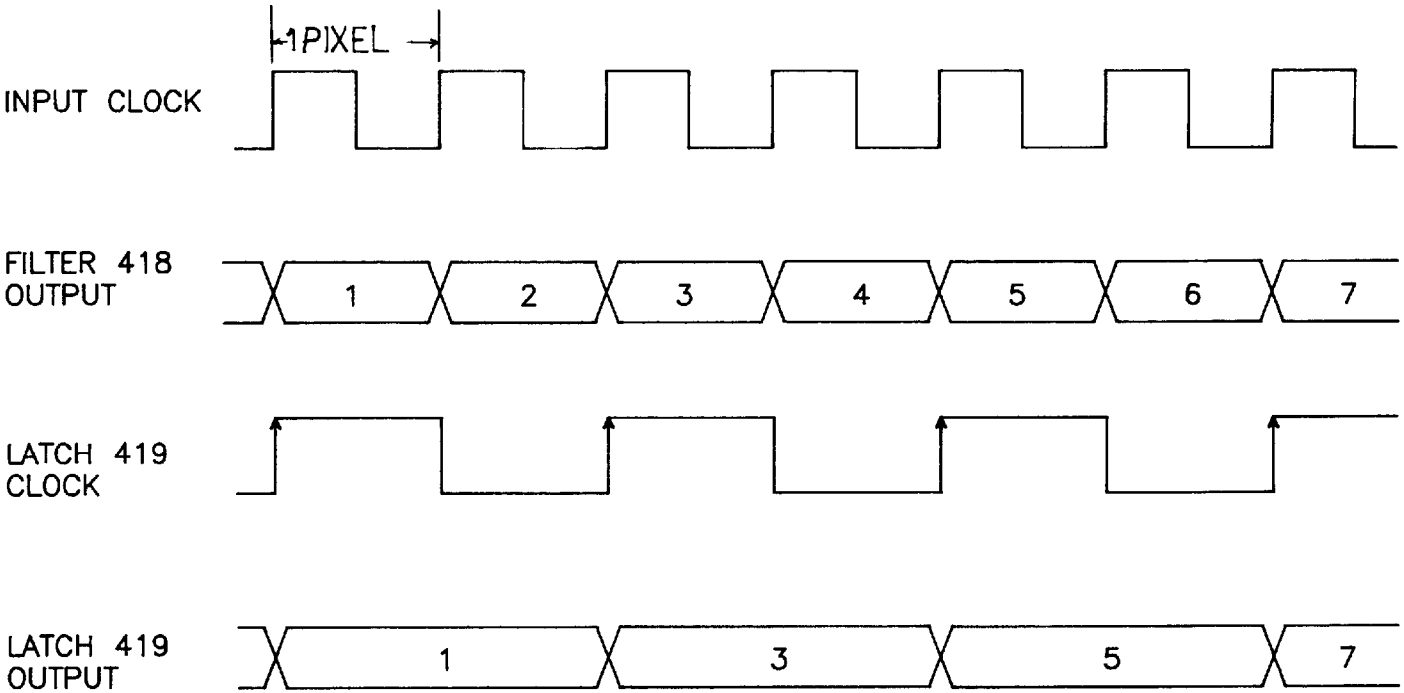
FIGS. 8A to 8D are waveform diagrams of signals from components in a 2:1 horizontal decimator in FIG. 6.

FIGS. 8A to 8D are waveform diagrams illustrating the operation of the 2:1 horizontal decimator 416. When the output video signal from the filter 418 as shown in FIG. 8B is inputted in response to an input clock signal as shown in FIG. 8A, it is latched into the latch 419 in response to a latch clock signal as shown in FIG. 8C in such a manner that one of the successive two pixels thereof is skipped (in groups of two pixels). Then, the latched pixel from the latch 419 is outputted at a speed of half that of the input clock signal as shown in FIG. 8D.

Figure 9:
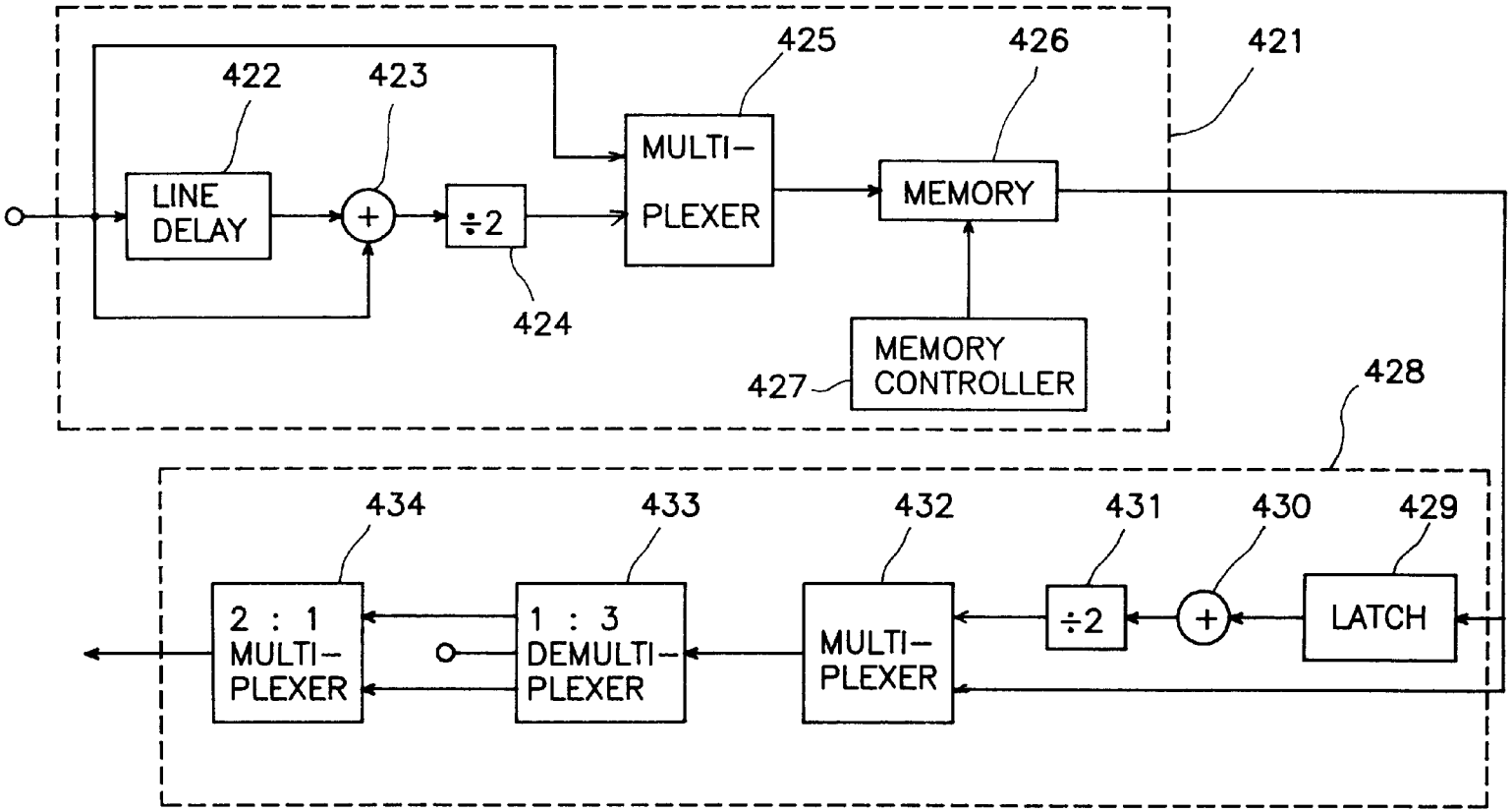
FIG. 9 is a detailed block diagram of a 3:2 decimation circuit in FIG. 1.

Referring to FIG. 9, there is shown a detailed block diagram of the 3:2 decimation circuit 420 in FIG. 1. As shown in this drawing, the 3:2 decimation circuit 420 includes a 3:2 vertical decimator 421 for performing a 3:2 vertical decimation operation with respect to the output video signal from the multiplexer 300, and a 3:2 horizontal decimator 428 for performing a 3:2 horizontal decimation operation with respect to an output video signal from the 3:2 vertical decimator 421. The 3:2 vertical decimator 421 includes a line delay 422, an adder 423, a 2-divider 424, a multiplexer 425, a memory 426 and a memory controller 427. The line delay 422 delays the output video signal from the multiplexer 300 in the unit of line and outputs the delayed video signal to the adder 423, which also inputs the output video signal from the multiplexer 300. The adder 423 adds a present line of the output video signal from the multiplexer 300 to a previous line thereof delayed by the line delay 422 and outputs the resultant signal to the 2-divider 424. The 2-divider 424 divides an output video signal from the adder 423 by 2 and outputs the resultant signal to the multiplexer 425, which also inputs the output video signal from the multiplexer 300. The multiplexer 425 selects alternately the output video signal from the multiplexer 300 and an output video signal from the 2-divider 424 and outputs the selected video signal to the memory 426. Namely, a first one of three successive third horizontal scanning lines of the output video signal from the multiplexer 300 is directly applied to the multiplexer 425, whereas second and third lines thereof are averaged through the line delay 422, the adder 423 and the 2-divider 424 and then applied to the multiplexer 425. As a result, the multiplexer 425 selects alternately the first one of the three successive third lines of the output video signal from the multiplexer 300 and the average of the second and three lines thereof or the output signal from the 2-divider 424. Then, the memory 426 performs write and read operations with respect to an output video signal from the multiplexer 425 under control of the memory controller 427.

Figures 10A, 10B, 10C, 10D, 10E, 10F, 10G:
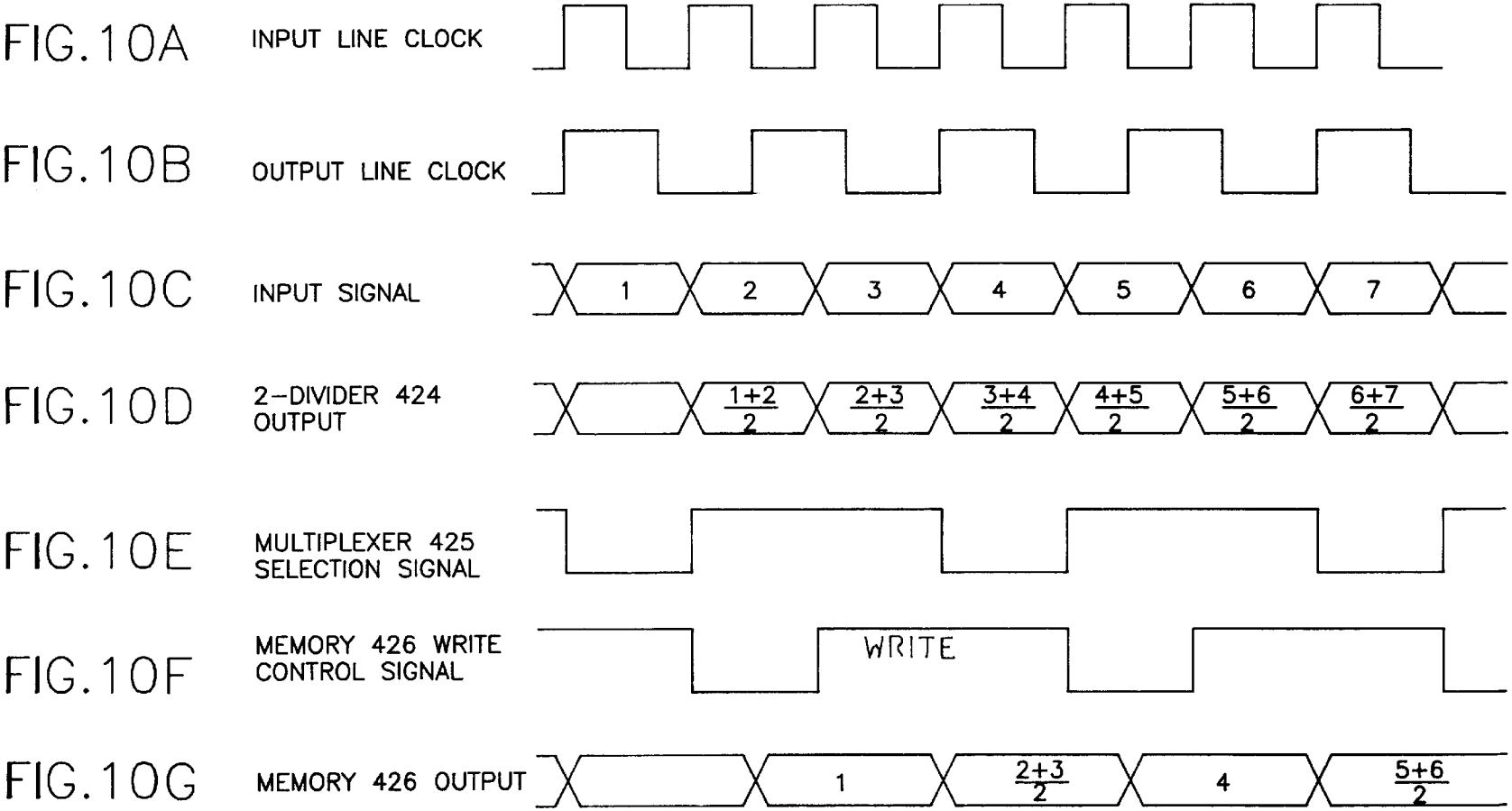
FIGS. 10A to 10G are waveform diagrams of signals from components in a 3:2 vertical decimator in FIG. 9.

FIGS. 10A to 10G are waveform diagrams illustrating the operation of the 3:2 vertical decimator 421. Because a vertical decimation ratio is 3:2, input and output line clock signals are provided as shown in FIGS. 10A and 10B, respectively. FIG. 10C shows the output video signal from the multiplexer 300 which is inputted in response to the input line clock signal as shown in FIG. 10A. FIG. 10D shows the output video signal from the 2-divider 424. In response to a multiplexer selection signal as shown in FIG.

10E, the multiplexer 425 selects the output video signal from the 2-divider 424 for the second and third ones of the three successful lines of the output video signal from the multiplexer 300. The output video signal from the multiplexer 425 is written into the memory 426 in response to a write control signal from the memory controller 427 as shown in FIG. 10F. Namely, the output video signal from the multiplexer 300 as shown in FIG. 10C and the output video signal from the 2-divider 424 as shown in FIG. 10D are selectively written into the memory 426 in response to the write control signal from the memory controller 427 as shown in FIG. 10F. In the read operation, under the control of the memory controller 427, the stored signals from the memory 426 are read as shown in FIG. 10G in response to the input line clock signal as shown in FIG. 10B.

The 3:2 horizontal decimator 428 includes, as shown in FIG. 9, a latch 429, an adder 430, a 2-divider 431, a multiplexer 432, a 1:3 demultiplexer 433 and a 2:1 multiplexer 434. The latch 429 delays the output video signal from the 3:2 vertical decimator 421 in the unit of a pixel and outputs the delayed video signal to the adder 430, which also inputs the output video signal from the 3:2 vertical decimator 421. The adder 430 adds a present pixel of the output video signal from the 3:2 vertical decimator 421 to a previous pixel thereof delayed by the latch 429 and outputs the resultant signal to the 2-divider 431. The 2-divider 431 divides an output video signal from the adder 430 by 2 and outputs the resultant signal to the multiplexer 432, which also inputs the output video signal from the 3:2 vertical decimator 421. The multiplexer 432 selects alternately the output video signal from the 3:2 vertical decimator 421 and an output video signal from the 2-divider 431 and outputs the selected video signal to the 1:3 demultiplexer 433. The 1:3 demultiplexer 433 1:3-demultiplexes an output video signal from the multiplexer 432. One of three output signals from the 1:3 demultiplexer 433 is given up and the remaining two output signals therefrom are applied to the 2:1 multiplexer 434. Then, the 2:1 multiplexer 434 selects alternately the two output signals from the 1:3 demultiplexer 433.

FIGS. 11A to 11I are waveform diagrams illustrating the operation of the 3:2 horizontal decimator 428. When the output video signal from the 3:2 vertical decimator 421 as shown in FIG. 11C is inputted in response to an input clock signal as shown in FIG. 11A, it is then applied to the latch 429, the adder 430 and the multiplexer 432. The adder 430 adds the present pixel of the output video signal from the 3:2 vertical decimator 421 to the previous pixel thereof delayed by the latch 429 and outputs the resultant signal to the 2-divider 431. The 2-divider 431 divides the output video signal from the adder 430 by 2 and outputs the resultant signal as shown in FIG. 11D to the multiplexer 432, which also inputs the output video signal from the 3:2 vertical decimator 421 as shown in FIG. 11C. The multiplexer 432 selects the output video signal from the 3:2 vertical decimator 421 as shown in FIG. 11C in a low interval of a multiplexer selection signal as shown in FIG. 11E, whereas the output signal from the 2-divider 431 as shown in FIG. 11D in a high interval of the multiplexer selection signal as shown in FIG. 11E. As a result, the multiplexer 432 provides its output signal as shown in FIG. 11F. The 1:3 demultiplexer 433 1:3-demultiplexes the output video signal from the multiplexer 432 as shown in FIG. 11F and provides the two output signals as shown in FIGS. 11G and 11H. The 2:1 multiplexer 434 selects alternately the two output signals from the 1:3 demultiplexer 433 as shown in FIGS. 11G and 11H in response to an output clock signal as shown in FIG. 11B. As a result, the 2:1 multiplexer 434 provides its output signal as shown in FIG. 11I.

Referring again to FIG. 1, the display mode conversion circuit 500 includes first to third NTSC converters 510–530, each of which converts a display mode of the output video signal from the decimation circuit 400 into that desired by the user, and a multiplexer 540 for selecting one of the output video signal from the decimation circuit 400 and output video signal from the first to third NTSC converters 510–530 according to a user's selection.

Figure 2A:
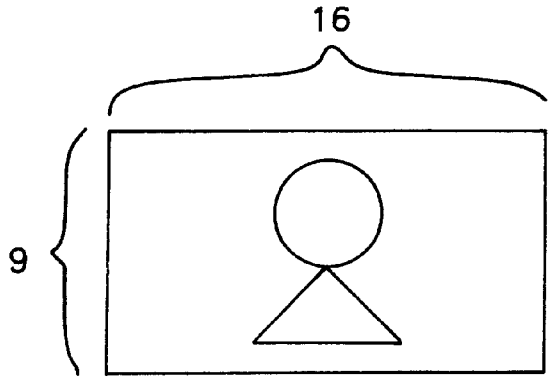
FIGS. 2A to 2D are views illustrating video signal display modes in accordance with the present invention.
Figure 2B:
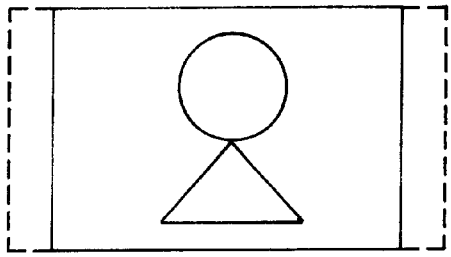
Figure 2C:
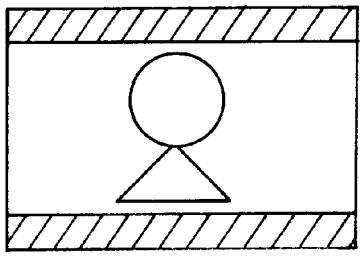
Figure 2D:
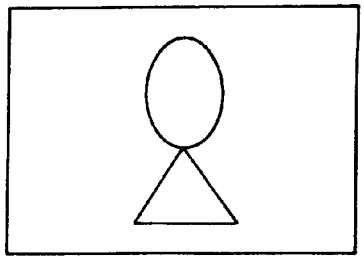

FIGS. 2A to 2D are views illustrating video signal display modes in accordance with the present invention. FIG. 2A shows a first display mode of displaying an input video signal at an aspect ratio of 16:9, namely, displaying the output video signal from the decimation circuit 400 directly on the screen of the monitor. This first display mode is applicable to a wide screen TV and etc. FIG. 2B shows a second display mode applicable to an existing non-high definitions TV receiver with an aspect ratio of 4:3. This second display mode is performed by removing both side screen portions of the output video signal from the decimation circuit 400 and displaying the resultant video signal at the aspect ratio of 4:3. The second display mode conversion operation is performed by the first NTSC converter 510. FIG. 2C shows a third display mode of decimating vertically and horizontally the output video signal from the decimation circuit 400 to display it at the aspect ratio of 4:3 on the screen of the existing non-high definitions TV receiver with no loss of the contents and processing upper and lower portions of the screen in black. The third display mode conversion operation is performed by the second NTSC converter 520. FIG. 2D shows a fourth display mode of decimating horizontally the output video signal from the decimation circuit 400 while maintaining 525 vertical lines thereof naturally, and displaying the resultant video signal at the aspect ratio of 4:3. In this case, a horizontally compressed picture appears on the screen. The fourth display mode conversion operation is performed by the third NTSC converter 530.

Figure 12:
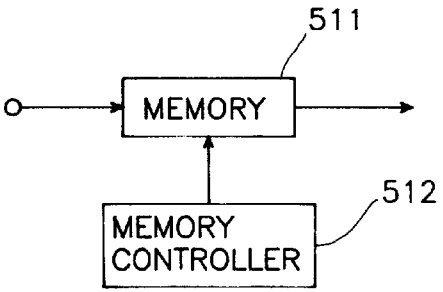
FIG. 12 is a detailed block diagram of a first NTSC converter in FIG. 1.

Referring to FIG. 12, there is shown a detailed block diagram of the first NTSC converter 510. As shown in this drawing, the first NTSC converter 510 includes a memory 511 for storing the output video signal from the decimation circuit 400 in the unit of a line, and a memory controller 512 for controlling the memory 511 to read only desired pixels therefrom. For the purpose of cutting both horizontal side portions of the frame, each line of the output video signal from the decimation circuit 400 is written into the memory 511 and only the desired pixels are read therefrom under the control of the memory controller 512.

Figure 13:
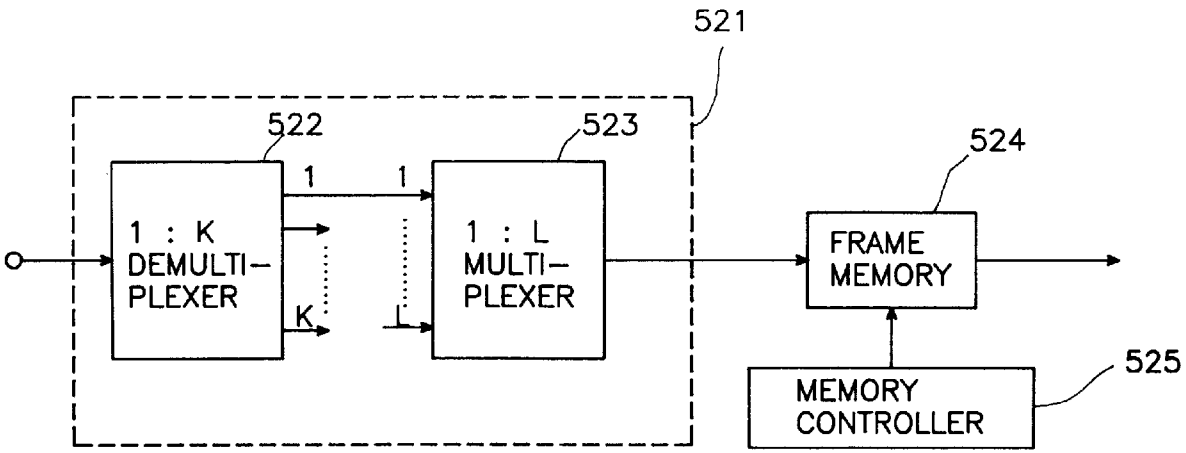
FIG. 13 is a detailed block diagram of a second NTSC converter in FIG. 1.

Referring to FIG. 13, there is shown a detailed block diagram of the second NTSC converter 520. As shown in this drawing, the second NTSC converter 520 includes a K:L horizontal decimator 521, a frame memory 524 and a memory converter 525. The K:L horizontal decimator 521 includes a 1:K demultiplexer 522 and an L:1 multiplexer 523. The second NTSC converter 520 performs the third display mode conversion operation to decimate vertically and horizontally the output video signal from the decimation circuit 400 to display it at the aspect ratio of 4:3 on the screen of the existing TV receiver with no loss of the contents and process the upper and lower portions of the screen in black as shown in FIG. 2C. Namely, in the case where the output video signal from the decimation circuit 400 is to be horizontally decimated at a ratio of K:L so that it can be displayed at the aspect ratio of 4:3, it is first demultiplexed by the 1:K demultiplexer 522, L signals are selected among the demultiplexed signals and the selected L signals are then multiplexed by the L:1 multiplexer 523. As a result, the horizontal decimation operation is performed at the ratio of K:L. Then, an output signal from the K:L horizontal decimator 521 is stored into the frame memory 524 to be vertically decimated under control of the memory controller 525. Also, the memory controller 525 controls the frame memory 524 to set all signal components, to be displayed on the upper and lower portions of the screen, to "0", so as to process them in black.

FIGS. 14A and 14B are waveform diagrams illustrating a write operation of the frame memory 524 for the 3:2 vertical decimation. The vertical decimation is performed by controlling the frame memory 524 in response to a write control signal from the memory controller 525. For example, when a video signal is inputted in response to a line clock signal as shown in FIG. 14A, two of successive three lines thereof are selectively written into the frame memory 524 in response to the write control signal from the memory controller 525 as shown in FIG. 14B.

Referring to FIG. 15, there is shown a detailed block diagram of the third NTSC converter 530. As shown in this drawing, the third NTSC converter 530 includes a 1:K demultiplexer 531 and an L:1 multiplexer 532. The third NTSC converter 530 performs the fourth display mode conversion operation to decimate horizontally the output video signal from the decimation circuit 400 and display the resultant video signal at the aspect ratio of 4:3 as shown in FIG. 2D. Namely, in the case where a horizontal decimation ratio is K:L, the output video signal from the decimation circuit 400 is first demultiplexed by the 1:K demultiplexer 531, L signals are selected among the demultiplexed signals and the selected L signals are then multiplexed by the L:1 multiplexer 532. As a result, the horizontal decimation operation is performed at the ratio of K:L.

Therefore, one of the output video signal from the decimation circuit 400 and the output video signals from the first to third NTSC converters 510–530 is selected by the multiplexer 540 according to the display mode desired by the user, so that it can be displayed on the existing TV receiver.

The display processor 600 acts to display the output video signal from the display mode conversion circuit 500 on the screen of the monitor.

The multiplexer selection controller 700 are adapted to check the format of the compressed input digital video signal and output the plurality of control signals S0–S2 in accordance with the checked result to control the frame rate conversion circuit 200 and the multiplexers 300 and 440. Namely, the multiplexer selection controller 700 outputs the control signal S0 to the frame rate conversion circuit 200 according to whether the frame rate of the compressed input digital video signal is 24 Hz or 60 Hz. The frame rate conversion circuit 200 converts the frame rate of the compressed input digital video signal into 30 Hz in response to the control signal SO from the multiplexer selection controller 700. Also, the multiplexer selection controller 700 outputs the control signal S1 to the multiplexer 300 according to whether the frame rate of the compressed input digital video signal is 30 Hz. In response to the control signal S1 from the multiplexer selection controller 700, the multiplexer 300 selects the output video signal from the decoder 100 if the frame rate of the compressed input digital video signal is 30 Hz, whereas the output video signal from the frame rate conversion circuit 200 if the frame rate of the compressed input digital video signal is not 30 Hz but 24 Hz or 60 Hz. Further, the multiplexer selection controller 700 outputs the control signal S2 to the multiplexer 440 according to whether the number of the horizontal scanning lines of the compressed input digital video signal is 525, 1050 or 787.5. In response to the control signal S2 from the multiplexer selection controller 700, the multiplexer 440 selects the output video signal from the multiplexer 300 if the number of the horizontal scanning lines of the compressed input digital video signal is 525, whereas the output video signal from the 2:1 decimation circuit 410 if the number of the horizontal scanning lines of the compressed input digital video signal is 1050. On the other hand, if the number of the horizontal scanning lines of the compressed input digital video signal is 787.5, the multiplexer 440 selects the output video signal from the 3:2 decimation circuit 420.

Figure 16:
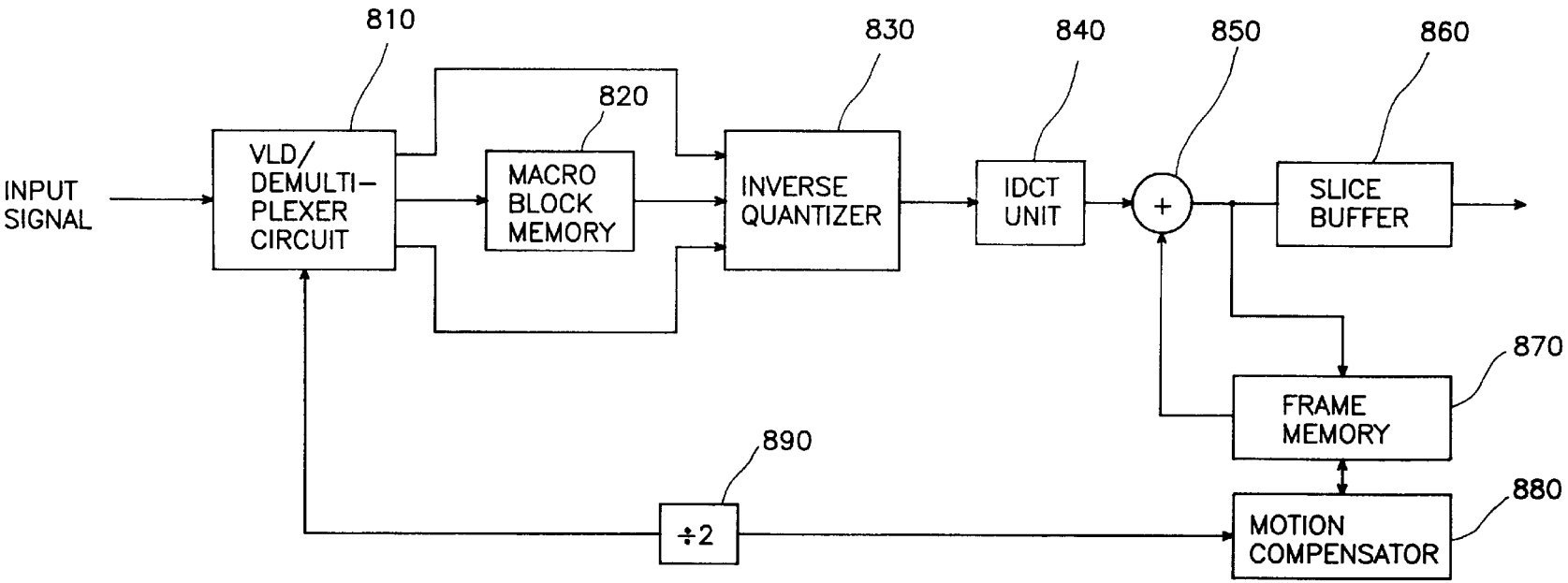
FIG. 16 is a detailed block diagram of an alternative embodiment of the decoder in FIG. 1.

Referring to FIG. 16, there is shown a detailed block diagram of an alternative embodiment of the decoder 100 in FIG. 1. As shown in this drawing, the decoder 100 includes a VLD/demultiplexer circuit 810 for decoding the compressed input digital video signal, a macro block memory 820 for storing DCT coefficients from the VLD/demultiplexer circuit 810 in the unit of a macro block and outputting only ones of the stored DCT coefficients corresponding to low-frequency components in the unit of a 4×4 block, and an inverse quantizer 830 for inverse-quantizing the DCT coefficients from the macro block memory 820 according to macro block type and quantization level information from the VLD/demultiplexer circuit 810. Also, the decoder 100 includes an IDCT unit 840 for performing an inverse discrete cosine transform with respect to the inverse-quantized DCT coefficients from the inverse quantizer 830 to obtain a displaced frame difference signal indicative of a difference between previous and present frames, a frame memory 870 for storing a restored video signal of the previous frame, a divider 890 for scaling motion information from the VLD/demultiplexer circuit 810 by ½, and a motion compensator 880 for compensating for a motion of a video signal of the present frame on the basis of the restored video signal of the previous frame from the frame memory 870 and the motion information scaled by the divider 890 and outputting the motion-compensated video signal to the frame memory 870. Further, the decoder 100 includes an adder 850 for adding the displaced frame difference signal from the IDCT unit 840 and the motion-compensated video signal from the frame memory 870 to restore the video signal of the present frame and outputting the restored video signal of the present frame to the frame memory 870, and a slice buffer 860 for inputting the restored video signal of the present frame from the adder 850 in the unit of block and outputting the inputted video signal in the unit of line.

The operation of the alternative embodiment of the decoder 100 with the above-mentioned construction in accordance with the present invention will hereinafter be described in detail.

First, the VLD/demultiplexer circuit 810 decodes the compressed input digital video signal and outputs the deemed DCT coefficients to the macro block memory 820. The macro block memory 820 stores the DCT coefficients from the VLD/demultiplexer circuit 810 in the unit of an 8×8 macro block and outputs only ones of the stores DCT coefficients corresponding to the low-frequency components in the unit of a 4×4 block. Alternatively, a counter may be used instead of the macro block memory 820 to output only the DCT coefficients of a 4×4 block corresponding to the low-frequency components to the inverse quantizer 830. The inverse quantizer 830 inverse-quantizes the DCT coefficients from the macro block memory 820 according to the macro block type and quantization level information from the VLD/demultiplexer circuit 810. The IDCT unit 840 performs the inverse discrete cosine transform with respect to the inverse-quantized DCT coefficients from the inverse quantizer 830. As a result of the inverse discrete cosine transform, the IDCT unit 840 obtains the displaced frame difference signal indicative of the difference between the previous and present frames. Noticeably, each speed of the inverse-quantization and IDCT operations is ¼ a decoding speed because they are processed in the unit of a 4×4 block.

On the other hand, the motion information from the VLD/demultiplexer circuit 810 is scaled by ½ by the divider 890 and then applied to the motion compensator 880. The ½-scaling operation is performed because the 8×8 macro block is cut vertically and horizontally by ½ to extract only the 4×4 block therefrom. The motion compensator 880 compensates for the motion of the video signal of the present frame on the basis of the restored video signal of the previous frame from the frame memory 870 and the motion information scaled by the divider 890. Then, the motion-compensated video signal from the motion compensator 880 is applied to the frame memory 870. The adder 850 adds the displaced frame difference signal from the IDCT unit 840 and the motion-compensated video signal from the frame memory 870 to restore the video signal of the present frame.

The restored video signal of the present frame from the adder 850 is applied to the frame memory 870 for the motion compensation of the next frame. The restored video signal of the present frame from the adder 850 is also applied to the slice buffer 860. The slice buffer 860 inputs the restored video signal of the present frame from the adder 850 in the unit of block and outputs the inputted video signal in the unit of line. Noticeably, the frame memory 870 has a size of ¼ that of an existing frame memory because the video signal is processed in the unit of a 4×4 block.

As apparent from the above description, according to the present invention, the received video signal can be displayed on the existing non-high definitions TV receiver in the various display modes. Therefore, the user can view an HDTV broadcasting even on the existing non-high definitions TV receiver.

Although the preferred embodiments of the present invention have been disclosed for illustrative purposes, those skilled in the an will appreciated that various modifications, additions and substitutions are possible, without departing from the scope and spirit of the invention as disclosed in the accompanying claims.

What is claimed is:

1. A digital video signal reception apparatus comprising:

multiplexer selection control means for outputting a plurality of control signals according to a format of a compressed input digital video signal;

decoding means for decoding the compressed input digital video signal;

frame rate conversion means for converting a frame rate of the decoded digital video signal from said decoding means into a desired value under the control of said multiplexer selection control means;

first multiplexing means for selecting one of the decoded digital video signal from said decoding means and an output video signal from said frame rate conversion means under the control of said multiplexer selection control means;

decimation means for performing a decimation operation to convert the number of horizontal scanning lines of an output video signal from said first multiplexing means into a desired value;

display mode conversion means for performing a display mode conversion operation so that an output video signal from said decimation means can be displayed in a desired display mode; and display processing means for displaying an output video signal from said display mode conversion means on a screen of a monitor.

2. A digital video signal reception apparatus as set forth in claim 1, wherein said decoding means includes:

a variable length decoder/demultiplexer circuit for decoding the compressed input digital video signal;

an inverse quantizer for inverse-quantizing discrete cosine transform coefficients from said variable length decoder/demultiplexer circuit;

an inverse discrete cosine transform unit for performing an inverse discrete cosine transform with respect to the inverse-quantized discrete cosine transform coefficients from said inverse quantizer to obtain a displaced frame difference signal indicative of a difference between previous and present frames;

a frame memory for storing a restored video signal of the previous frame;

a motion compensator for compensating for a motion of a video signal of the present frame on the basis of the restored video signal of the previous frame from said frame memory and motion information from said variable length decoder/demultiplexer circuit and outputting the motion-compensated video signal to said frame memory;

an adder for adding the displaced frame difference signal from said inverse discrete cosine transform unit and the motion-compensated video signal from said frame memory to restore the video signal of the present frame and outputting the restored video signal of the present frame to said frame memory; and a slice buffer for inputting the restored video signal of the present frame from said adder in units of blocks and outputting the inputted video signal in units of lines.

3. A digital video signal reception apparatus as set forth in claim 1, wherein said frame rate conversion means includes:

a first memory for storing the decoded digital video signal from said decoding means to convert the frame rate thereof into 30 Hz if it is 60 Hz;

second and third memories for storing the decoded digital video signal from said decoding means to convert the frame rate thereof into 30 Hz if it is 24 Hz;

a memory controller for controlling said first to third memories;

a first multiplexer for selecting alternately output video signals from said second and third memories; and a second multiplexer for selecting one of output video signals from said first memory and said first multiplexer under the control of said multiplexer selection control means.

4. A digital video signal reception apparatus as set forth in claim 1, wherein said decimation means includes:

2:1 decimation means for performing a 2:1 decimation operation with respect to the output video signal from said first multiplexing means;

3:2 decimation means for performing a 3:2 decimation operation with respect to the output video signal from said first multiplexing means; and second multiplexing means for selecting one of the output video signal from said first multiplexing means, an output video signal from said 2:1 decimation means and an output video signal from said 3:2 decimation means under the control of said multiplexer selection control means.

5. A digital video signal reception apparatus as set forth in claim 1, wherein said display mode conversion means includes:

a plurality of NTSC conversion means, each of said plurality of NTSC conversion means for converting a display mode of the output video signal from said decimation means into the desired display mode; and second multiplexing means for selecting one of the output video signal from said decimation means and an output video signals from said plurality of NTSC conversion means according to a user's selection.

6. A digital video signal reception apparatus as set forth in claim 5, wherein said desired mode includes:

a first display mode of displaying the output video signal from said decimation means directly at an aspect ratio of 16:9;

a second display mode of removing both side screen portions of the output video signal from said decimation means and displaying the resultant video signal at an aspect ratio of 4:3;

a third display mode of decimating vertically and horizontally the output video signal from said decimation means to display it at the aspect ratio of 4:3 with no loss of the contents and processing upper and lower screen portions of the resultant video signal in black; and a fourth display mode of decimating horizontally the output video signal from said decimation means and displaying the resultant video signal at the aspect ratio of 4:3.

7. A digital video signal reception apparatus as set forth in claim 1, wherein said multiplexer selection control means is adapted to control said frame rate conversion means according to whether a frame rate of the compressed input digital video signal is 24 Hz or 60 Hz, to control said first multiplexing means according to whether the frame rate of the compressed input digital video signal is 30 Hz and to control said decimation means according to the number of horizontal scanning lines of the compressed input digital video signal.

8. A digital video signal reception apparatus as set forth in claim 4, wherein said 2:1 decimation means includes:

2:1 vertical decimation means for performing a 2:1 vertical decimation operation with respect to the output video signal from said first multiplexing means; and 2:1 horizontal decimation means for performing a 2:1 horizontal decimation operation with respect to an output video signal from said 2:1 vertical decimation means.

9. A digital video signal reception apparatus as set forth in claim 4, wherein said 3:2 decimation means includes:

3:2 vertical decimation means for performing a 3:2 vertical decimation operation with respect to the output video signal from said first multiplexing means; and 3:2 horizontal decimation means for performing a 3:2 horizontal decimation operation with respect to an output video signal from said 3:2 vertical decimation means.

10. A digital video signal reception apparatus as set forth in claim 5, wherein each of said plurality of NTSC conversion means includes:

a memory for storing the output video signal from said decimation means in units of lines, each line including a plurality of pixels; and a memory controller for controlling said memory to read only desired pixels therefrom.

11. A digital video signal reception apparatus as set forth in claim 5, wherein each of said plurality of NTSC conversion means includes:

horizontal decimation means for performing a horizontal decimation operation with respect to the output video signal from said decimation means at a desired ratio;

a frame memory for storing an output video signal from said horizontal decimation means; and a memory controller for controlling said frame memory to decimate vertically the output video signal from said horizontal decimation means and set components of the resultant video signal, to be displayed in black, to "0".

12. A digital video signal reception apparatus as set forth in claim 5, wherein each of said plurality of NTSC conversion means includes:

a demultiplexer for demultiplexing the output video signal from said decimation means and providing a first desired number of output signals; and a multiplexer for multiplexing a second desired number of the output signal from said demultiplexer;

said first and second desired numbers being determined to perform a horizontal decimation operation with respect to the output video signal from said decimation means at a desired ratio.

13. A digital video signal reception apparatus as set forth in claim 8, wherein said 2:1 vertical decimation means includes:

a plurality of line delays connected in series to delay the output video signal from said first multiplexing means;

a filter for filtering the output video signal from said first multiplexing means and output video signals from said plurality of line delays;

a memory for storing an output video signal from said filter; and a memory controller for controlling said memory to perform a write operation with respect to the output video signal from said filter in such a manner that one of two successive lines thereof is skipped, in groups of two lines.

14. A digital video signal reception apparatus as set forth in claim 8, wherein said 2:1 horizontal decimation means includes:

a plurality of latches connected in series to delay the output video signal from said 2:1 vertical decimation means;

a filter for filtering the output video signal from said 2:1 vertical decimation means and output video signals from said plurality of latches; and a latch for performing a latching operation with respect to an output video signal from said filter in such a manner that one of two successive pixels thereof is skipped, in groups of two pixels.

15. A digital video signal reception apparatus as set forth in claim 9, wherein said 3:2 vertical decimation means includes:

a line delay for delaying the output video signal from said first multiplexing means in units of lines;

an adder and a divider for taking the average of the output video signal from said first multiplexing means and an output video signal from said line delay;

a multiplexer for selecting alternately the output video signal from said first multiplexing means and output video signal from said divider;

a memory for storing an output video signal from said multiplexer; and a memory controller for controlling said memory to read alternately the output video signal from said first multiplexing means and the output video signal from said divider.

16. A digital video signal reception apparatus as set forth in claim 9, wherein said 3:2 horizontal decimation means includes:

a latch for delaying the output video signal from said 3:2 vertical decimation means in units of pixels;

an adder and a divider for taking the average of the output video signal from said 3:2 vertical decimation means and an output video signal from said latch;

a multiplexer for selecting alternately the output video signal from said 3:2 vertical decimation means and an output video signal from said divider;

a 1:3 demultiplexer for 1:3-demultiplexing an output video signal from said multiplexer; and a 2:1 multiplexer for 2:1-multiplexing selected two of output signals from said 1:3 demultiplexer.

17. A digital video signal reception apparatus as set forth in claim 11, wherein said horizontal decimation means includes:

a demultiplexer for demultiplexing the output video signal from said decimation means and providing a first desired number of output signals; and a multiplexer for multiplexing a second desired number of the output signals from said demultiplexer;

said first and second desired numbers being determined to perform the horizontal decimation operation with respect to the output video signal from said decimation means at the desired ratio.

18. A digital video signal reception apparatus as set forth in claim 1, wherein said decoding means includes:

a variable length decoder/demultiplexer circuit for decoding the compressed input digital video signal;

a macro block memory for storing discrete cosine transform coefficients from said variable length decoder/demultiplexer circuit in units of macro blocks and outputting only ones of the stored discrete cosine transform coefficients corresponding to low-frequency components in units of blocks of a desired size;

an inverse quantizer for inverse-quantizing the discrete cosine transform coefficients from said macro block memory according to macro block type and quantization level information from said variable length decoder/demultiplexer circuit;

an inverse discrete cosine transform unit for performing an inverse discrete cosine transform with respect to the inverse-quantized discrete cosine transform coefficients from said inverse quantizer to obtain a displaced frame difference signal indicative of a difference between previous and present frames;

a frame memory for storing a restored video signal of the previous frame;

a divider for scaling motion information from said variable length decoder/demultiplexer circuit at a desired ratio;

a motion compensator for compensating for a motion of a video signal of the present frame on the basis of the restored video signal of the previous frame from said frame memory and the motion information scaled by said divider and outputting the motion-compensated video signal to said frame memory;

an adder for adding the displaced frame difference signal from said inverse discrete cosine transform unit and the motion-compensated video signal from said frame memory to restore the video signal of the present frame and outputting the restored video signal of the present frame to said frame memory; and a slice buffer for inputting the restored video signal of the present frame from said adder in the unit of block and outputting the inputted video signal in the unit of line.

19. A digital video signal reception apparatus as set forth in claim 18, wherein said macro block memory is adapted to store the discrete cosine transform coefficients from said variable length decoder/demultiplexer circuit in units of macro blocks and output only ones of the stored discrete cosine transform coefficients corresponding to the low-frequency components in units of 4×4 blocks.

20. A digital video signal reception apparatus as set forth in claim 18, wherein said inverse quantizer is adapted to inverse-quantize the discrete cosine transform coefficients from said macro block memory in units of 4×4 blocks.

21. A digital video signal reception apparatus as set forth in claim 18, wherein said inverse discrete cosine transform unit is adapted to perform the inverse discrete cosine transform with respect to the inverse-quantized discrete cosine transform coefficients from said inverse quantizer in units of 4×4 blocks.

22. A digital video signal reception apparatus as set forth in claim 18, wherein a counter is included instead of said macro block memory in said decoding means to input the discrete cosine transform coefficients from said variable length decoder/demultiplexer circuit and output only ones of the inputted discrete cosine transform coefficients corresponding to the low-frequency components to said inverse quantizer.

23. A digital video signal reception apparatus as set forth in claim 18, wherein said divider is adapted to scale the motion from said variable length decoder/demultiplexer circuit by ½.

*24. A digital video signal reception apparatus comprising:*

*multiplexer selection control means for outputting a plurality of control signals according to a format of a compressed input digital video signal;*

*decoding means for decoding the compressed input digital video signal;*

*frame rate conversion means for converting a frame rate of the decoded digital video signal from said decoding means into a desired value under the control of said multiplexer selection control means;*

*decimation means for performing a decimation operation to convert the number of horizontal scanning lines of an output video signal from said frame rate conversion means into a desired value;*

*display mode conversion means for performing a display mode conversion operation so that an output video signal from said decimation means can be displayed in a desired display mode; and*

*display processing means for displaying an output video signal from said display mode conversion means on a screen of a monitor.*

*25. The digital video signal reception apparatus according to claim 24, wherein the frame rate conversion means processes a signal having a frequency of 60 Hz.*

*26. The digital video signal reception apparatus according to claim 24, wherein the frame rate conversion means processes a signal having a frequency of 24 Hz.*

*27. The digital video signal reception apparatus according to claim 24, wherein the decimation means includes a 2:1 horizontal decimation circuit.*

*28. The digital video signal reception apparatus according to claim 24, wherein the decimation means includes a 2:1 vertical decimation circuit.*

*29. The digital video signal reception apparatus according to claim 24, wherein the decimation means includes a 3:2 horizontal decimation circuit.*

*30. The digital video signal reception apparatus according to claim 24, wherein the decimation means includes a 3:2 vertical decimation circuit.*

*31. A digital video signal reception apparatus comprising:*

*multiplexer selection control means for outputting a plurality of control signals according to a format of a compressed input digital video signal;*

*decoding means for decoding the compressed input digital video signal;*

*frame rate conversion means for converting a frame rate of the decoded digital video signal from said decoding means into a desired value under the control of said multiplexer selection control means;*

*decimation means for performing a decimation operation to convert the number of horizontal scanning lines of an output video signal from said frame rate conversion means into a desired value; and*

*display processing means for displaying an output video signal from said decimation means on a screen of a monitor.*

*32. The digital video signal reception apparatus according to claim 31, wherein the frame rate conversion means processes a signal having a frequency of 60 Hz.*

*33. The digital video signal reception apparatus according to claim 31, wherein the frame rate conversion means processes a signal having a frequency of 24 Hz.*

*34. The digital video signal reception apparatus according to claim 31, wherein the decimation means includes a 2:1 horizontal decimation circuit.*

*35. The digital video signal reception apparatus according to claim 31, wherein the decimation means includes a 2:1 vertical decimation circuit.*

*36. The digital video signal reception apparatus according to claim 31, wherein the decimation means includes a 3:2 horizontal decimation circuit.*

*37. The digital video signal reception apparatus according to claim 31, wherein the decimation means includes a 3:2 vertical decimation circuit.*

*38. A digital video signal reception apparatus comprising:*

*a controller outputting a plurality of control signals according to a format of a compressed input digital video signal;*

*a decoder decoding the compressed input digital video signal;*

*a frame rate converter converting a frame rate of the decoded digital video signal from said decoder into a desired value under the control of said controller;*

*a decimation unit performing a decimation operation to convert the number of horizontal scanning lines of an output video signal from said frame rate converter into a desired value;*

*a display mode converter performing a display mode conversion operation so that an output video signal from said decimation unit can be displayed in a desired display mode; and*

*a display processing unit displaying an output video signal from the display mode converter on a screen of a monitor.*

*39. The digital video signal reception apparatus according to claim 38, wherein the frame rate converter processes a signal having a frequency of 60 Hz.*

*40. The digital video signal reception apparatus according to claim 38, wherein the frame rate converter processes a signal having a frequency of 24 Hz.*

*41. The digital video signal reception apparatus according to claim 38, wherein the decimation unit includes a 2:1 horizontal decimation circuit.*

*42. The digital video signal reception apparatus according to claim 38, wherein the decimation unit includes a 2:1 vertical decimation circuit.*

*43. The digital video signal reception apparatus according to claim 38, wherein the decimation unit includes a 3:2 horizontal decimation circuit.*

*44. The digital video signal reception apparatus according to claim 38, wherein the decimation unit includes a 3:2 vertical decimation circuit.*

*45. A digital video signal reception apparatus comprising:*

*a controller outputting a plurality of control signals according to a format of a compressed input digital video signal;*

*a decoder decoding the compressed input digital video signal;*

*a frame rate converter converting a frame rate of the decoded digital video signal from said decoder into a desired value under the control of said controller;*

*a decimation unit performing a decimation operation to convert the number of horizontal scanning lines of an output video signal from said frame rate converter into a desired value; and*

*a display processing unit displaying an output video signal from the decimation unit on a screen of a monitor.*

*46. The digital video signal reception apparatus according to claim 45, wherein the frame rate converter processes a signal having a frequency of 60 Hz.*

*47. The digital video signal reception apparatus according to claim 45, wherein the frame rate converter processes a signal having a frequency of 24 Hz.*

*48. The digital video signal reception apparatus according to claim 45, wherein the decimation unit includes a 2:1 horizontal decimation circuit.*

*49. The digital video signal reception apparatus according to claim 45, wherein the decimation unit includes a 2:1 vertical decimation circuit.*

*50. The digital video signal reception apparatus according to claim 45, wherein the decimation unit includes a 3:2 horizontal decimation circuit.*

*51. The digital video signal reception apparatus according to claim 45, wherein the decimation unit includes a 3:2 vertical decimation circuit.*

* * * * *